United States Patent Office 2,921,616
Patented Jan. 19, 1960

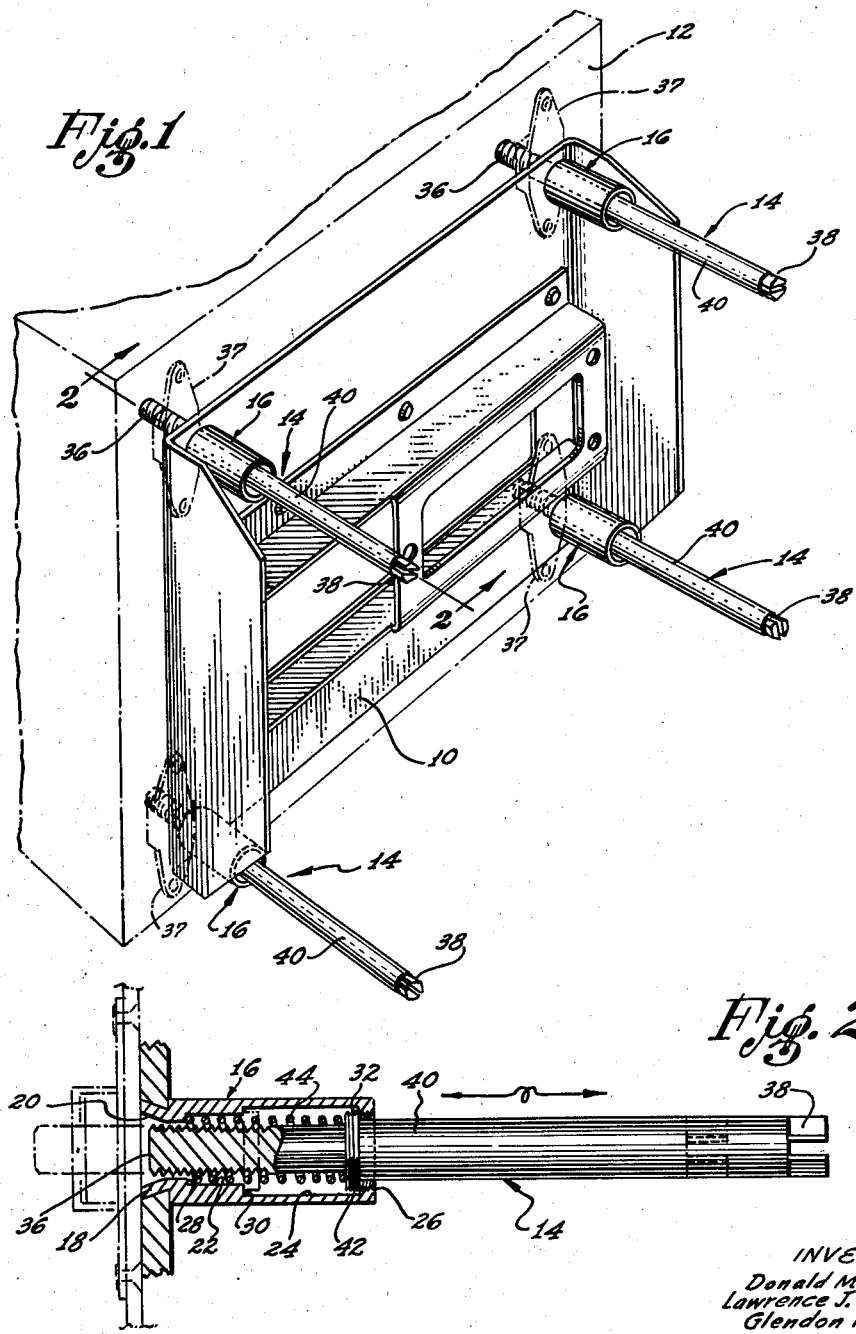

2,921,616

CAPTIVE SCREW AND SLEEVE HAVING MATING THREADED STOP SHOULDERS

Donald M. Threewit, Inglewood, Lawrence J. Stevenson, Hawthorne, and Glendon F. Kasson, North Hollywood, Calif., assignors to Northrop Corporation, Beverly Hills, Calif., a corporation of California Application March 24, 1958, Serial No. 723,937

1 Claim. (Cl. 151—69)

This invention relates to fasteners and more particularly to captive screw fasteners that have for their purpose the attaching and retaining of a sub assembly to a main or principal unit.

Captive fasteners are well known but there is a need for improved reliability, ease of operation, and over-all efficiency. Improved packaging techniques and increased use of readily interchangeable components have made this need more apparent.

The principal object of this invention is to provide captive screw fasteners secured to one of two units and having for their purpose the securing of the two units together.

Another object of this invention is to provide a captive screw fastener with the fastening means being retractable in order to protect and not subject the same to damage when its associated unit is not in the assembled condition.

A yet further object of this invention is to provide a captive screw fastener that has a fastener that is readily removable from its associated components yet is retained in an assembled position when in captive and retractable condition.

A yet further object of this invention is to provide a captive screw fastener wherein a positive indication is given when the fastener is disconnected from the attached unit, and wherein the disconnected position assures an absolutely freed condition of the unit being removed, in order that such a unit may be easily removed without the inconvenience of the fastener or fasteners remaining inadvertently attached.

A still further object of this invention is to provide a captive screw fastener that is simple, readily fabricated and suitable for low cost mass production.

Figure 1 is a fragmentary perspective view illustrating captive screw fasteners applied to a base member, and the latter in turn being attached to a principal unit shown in dotted lines.

Figure 2 is a cross-sectional view taken on line 2—2 in Figure 1 looking in the direction indicated and illustrating by dotted line the position the fastener is in when the base member is attached to the principal unit.

Reference is made to the drawings for a more detailed description of the present invention.

The base member, which could have any configuration, is designated by 10. The principal unit, to which the base member 10 is attached, is designated by 12 and schematically shown in dotted lines.

Located in each corner of the base member 10, in the form illustrated, is a captive screw fastener. Each captive screw fastener is identical to the other; therefore only one will be described.

A cylindrical tube 16 has a short end projection 18 with a reduced outside diameter. This end projection 18 is inserted in an opening in base member 10 and swaged in place in the manner illustrated in Figure 2.

The end projection 18 before swaging to base member 10, has a uniform inner bore 20 therethrough. The inner bore 20 or inside diameter of projection 18 is less than the inside diameter of the balance of the tube 16. Further, the outside diameter of projection 18 is less than the outside diameter of tube 16. Adjacent the bore 20 and concentrically arranged is a second larger bore 22; adjacent bore 22 is a still larger bore 24. Integral with the extreme free end of the tubular cylinder 16 adjacent bore 24 is a threaded ring 26.

The larger bore 22, as contrasted with bore 20, provides a stop shoulder or seat 28. However, the internal diameter of bore 22 is less than the outside diameter of projection 18. Bore 24 is larger than bore 22 and as a result there is a stop shoulder 30. Ring 26 has a reduced inside diameter as contrasted with bore 24 and therefore a stop shoulder 32 is provided. The inside diameter of ring 26 is less than the inside diameter of 24 but greater than the inside diameter of bore 22.

Extending into and through the tubular cylinder 16 is an elongated fastener or bolt broadly designated 14. One end 36 of the fastener is threaded and this threaded end extends through the principal unit 12 to receive an applicable female fitting 37. The end 38 of the fastener 34 in opposed relation to end 36 is hexagonal and notched in order that conventional tools may be used for assembling the base member 10 to the principal unit 12 through the medium of captive fasteners 14.

Intermediate the ends 36 and 38 and integral with the shank 40 of the fastener is a threaded ring 42 that engages the threaded ring 26 on the tubular cylinder 16.

Located in tubular cylinder 16, one end seating on shoulder 28, is a compression spring 44. The end of the spring in opposed relation to the seated end bears against ring 42 on fastener 34 to urge the latter to the solid line position illustrated in Figure 2 of the drawings.

The operation of the invention is as follows: The fastener or bolt 14 is threaded into the tubular cylinder 16 in the manner illustrated in Figure 2 of the drawings. Once being threaded into position the spring 44 engages the threaded ring 42, and in the absence of more force being applied to the fastener urges the ring into engagement with the shoulder 32. The result of this action maintains the threaded end 36 of the fastener 14 sheathed in tubular cylinder 16 and protected as long as the base member 10 is not attached or ready for attaching to the principal unit 12. When it is desired to attach base member 10 to principal unit 12 force is applied to fastener 14 in apposition to the spring force 44 and the fastener is urged to the dotted line position illustrated in Figure 2 wherein the threaded ring 42 seats or contacts shoulder 30. As previously stated, any female fitting may be applied to threaded end 36 to retain the base member 10 attached to principal unit 12.

When it is desired to remove base member 10 from principal unit 12, the fastener 14, after removing the threaded end 36 from the female fitting, assumes the solid line position illustrated in Figure 2 of the drawings.

The threaded ring 44 again engages shoulder 32 and by virtue of this fact it is made known that there is no longer an attachment between the base member 10 and principal unit 12. It is known that threaded end 36 is sheathed in tubular cylinder 16. Once this is known base member 10 can be removed from principal unit 12 without danger of damaging any component elements.

Further, due to the fact that the fastener 14 is threadedly inserted into tubular cylinder 16 the former can be readily removed if desired and another fastener substituted in its place.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A captive screw fastener comprising a tubular member having first, second and third concentric and graduated bores therein that define a first and second seat; a hollow projection on said member that defines the first bore; said projection having an outside diameter less than the outside diameter of said member but greater than the inside diameter of said second bore and the defined bore having an inside diameter less than the inside diameter of the second and third bores; an internally threaded ring integral with said tubular member and adjacent said third bore; said ring having an inside diameter less than the inside diameter of said third bore which defines a stop shoulder, but greater than the inside diameter of said second bore; a compression spring in said member that seats on said first seat; an elongated bolt, the threaded end of which is sheathed in said member when the spring is expanded; and an externally threaded and integral ring on said bolt intermediate its ends that threads through said internally threaded ring and seats against said stop shoulder when the spring is expanded and seats against said second seat when the spring is compressed, said bolt having an end portion of smaller diameter than said integral ring extending a substantial distance outwardly beyond said internally threaded ring and having a slotted, hexagonal free end.

References Cited in the file of this patent

UNITED STATES PATENTS

| | | |
|---|---|---|
| 375,206 | Shelton | Dec. 20, 1887 |
| 748,078 | Kaisling | Dec. 29, 1903 |
| 1,927,780 | Anderson | Sept. 19, 1933 |
| 2,831,520 | Clarke | Apr. 22, 1958 |